United States Patent [19]

Ness

[11] Patent Number: 5,130,185
[45] Date of Patent: Jul. 14, 1992

[54] DOUBLED SIDED PRESSURE SENSITIVE ADHESIVE

[76] Inventor: Irving S. Ness, 465A Wiggins St., Princeton, N.J. 08540

[21] Appl. No.: 571,727

[22] Filed: Aug. 24, 1990

[51] Int. Cl.$^5$ .............................. A61F 13/02
[52] U.S. Cl. ............................. 428/40; 428/136; 428/138; 428/343; 428/354; 428/906; 427/208
[58] Field of Search ............ 428/40, 138, 354, 343, 428/136, 906, 174, 124, 41; 427/208; 40/594, 630, 638; 493/378, 382, 403

[56] References Cited

U.S. PATENT DOCUMENTS

| | | | |
|---|---|---|---|
| 3,021,250 | 2/1962 | La Voie | 428/40 |
| 3,230,649 | 1/1966 | Karn | 428/40 |
| 3,783,083 | 1/1974 | Jenkins | 428/42 |
| 4,121,004 | 10/1978 | Ehrlund | 428/906 |
| 4,320,158 | 3/1982 | Seeley | 428/906 |
| 4,481,242 | 11/1984 | Fletcher | 428/136 |
| 4,574,098 | 3/1986 | Sampson | 428/212 |
| 4,582,737 | 4/1986 | Torgerson | 428/57 |
| 4,702,948 | 10/1987 | Sieber-Gadient | 428/40 |
| 4,792,473 | 12/1988 | Vidale | 428/906 |
| 4,839,206 | 6/1989 | Waldenberger | 428/40 |

*Primary Examiner*—Robinson, Ellis P.
*Assistant Examiner*—Nasser Ahmad
*Attorney, Agent, or Firm*—Robert L. Minier

[57] ABSTRACT

A double-sided, pressure-sensitive, adhesive tape having a release paper on an adhesive surface. The release paper has a plurality of spaced-apart areas that have a lesser degree of adhesive to the adhesive surface than the remaining area of the release paper.

4 Claims, 2 Drawing Sheets

DOUBLED SIDED PRESSURE SENSITIVE ADHESIVE

FIELD OF THE INVENTION

The present invention relates to pressure-sensitive adhesive tapes wherein the tape has pressure-sensitive adhesive on both sides of the tape. Such tapes are generally referred to as double-sided or double-faced adhesive tapes.

BACKGROUND OF THE INVENTION

Double-sided or double-faced adhesive tapes have been known for many years. Examples of double-sided adhesive tapes are described in U.S. Pat. Nos. 3,783,083, 4,528,230, 4,702,948, 4,574,098, and 4,582,737. Double-sided tapes are generally used in those areas where you do not desire to see the adhesive tape or it is not desired that the tape be placed on the outside surface of the material that you are trying to adhere. For example, double faced tapes may be used to adhere carpeting to a floor or to adhere insulation to a window or a door or to replace loosened flaps of wallpaper and the like.

Double-sided pressure sensitive adhesive tape usually comes in roll form. The adhesive on one surface of the double-sided tape has a release paper adhered to it and the tape is wound on itself into a roll. When in roll form, the outside surface of the release paper acts as the release surface for the adhesive on the opposite side of the tape. A piece of the tape may be removed from the roll and the side having the exposed adhesive adhered to a surface. Once the pressure sensitive adhesive is adhered to the surface, the release paper may be removed to expose the other layer of adhesive and allow a second surface to be adhered to that side. Because the adhesive on both sides of the tape is relatively aggressive in that it adheres with fair strength to surfaces, it is often difficult to remove the release paper. Furthermore, in many uses, it is desirable that the tape fit into a corner or into a configuration where it is extremely difficult to grasp an edge of the release paper to start to remove it from the adhesive. This is especially true if you are attempting to use the tape to attach insulation to something like a window where you want the tape to abut a corner of the window.

What I have discovered is an adhesive tape that eliminates this problem and allows the tape to be adhered to a surface including abutting a corner and provides for the easy removal of the release paper to expose the other adhesive surface of the tape.

SUMMARY OF THE PRESENT INVENTION

In accordance with the present invention, there is provided a roll of double-sided pressure sensitive adhesive tape. The tape has a backing layer. On both surfaces of the backing layer there is an adhesive layer. One of the adhesive layers has disposed on its surface a release layer or release paper. The release paper includes a plurality of intermittently spaced apart areas disposed over the surface of the release paper. The intermittent spaced-apart areas have a lesser degree of adhesion to the adhesive layer than the remainder of the release paper.

In certain embodiments of the present invention, the release paper may include a plurality of slits either V-shaped or semi-circular or other configurations as desired. The portion of the release paper bounded or defined by the slit is provided with a set such as being folded back on itself and then placed back on the adhesive. This provides that portion with a memory such that it tends to want to return to its previous folded position. Hence, these pre-set, portions do not adhere to the adhesive as well as the remainder of the release paper. These pre-set portions are intermittently disposed over the surface of the release paper so that even if the end or edge of the double sided tape is placed in a configuration such that it is difficult to start to remove the release paper from the end, one of these intermittently spaced apart areas will allow for the initiation of the removal of the release paper from the adhesive layer.

DETAILED DESCRIPTION OF THE DRAWINGS

Figure 1:
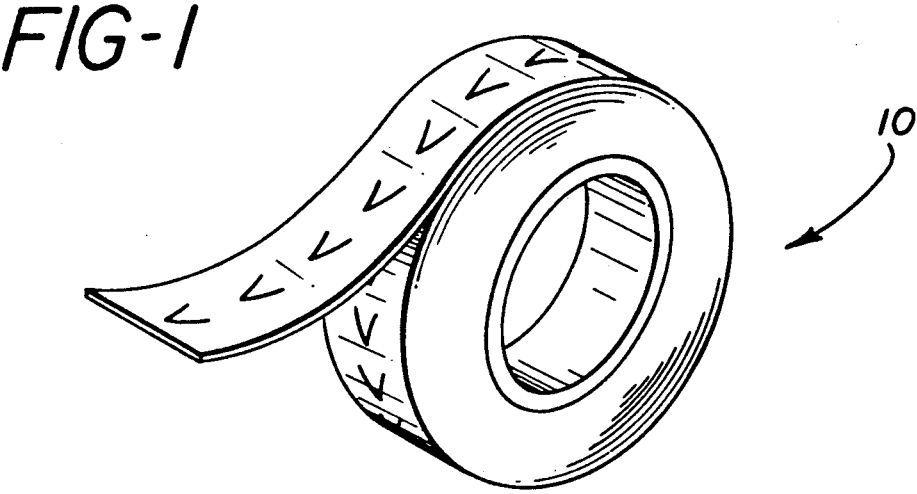
FIG. 1 is a perspective view of a roll of double-sided tape of the present invention.
Figure 2:
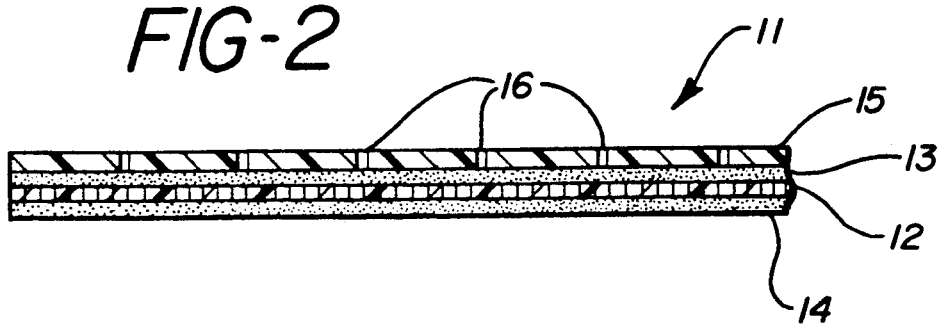
FIG. 2 is a cross-sectional view of the tape of the present invention with the cross-sectional view taken along the longitudinal center line of the tape.

Referring to the drawings, there is shown a roll 10 of double-sided tape of the present invention. As is more clearly shown in the cross-sectional view in FIG. 2, the tape 11 of the present invention comprises a backing member 12. On each side of this backing member is a pressure sensitive adhesive layer 13 and 14. The adhesive used is pressure sensitive adhesive and the adhesive on both sides of the backing has substantially the same adhesive characteristics as far as aggressiveness and adhesive strength is concerned. On top of one layer of adhesive is a release paper 15. The release paper is such as to allow the tape to be wound on itself in the roll form as shown in FIG. 1. As can be appreciated, when that tape is wound on itself, the top layer of the release paper will contact the outer surface of the exposed adhesive layer.

Disposed in a pattern on the surface of the release paper is a plurality of areas 16. In this configuration, the areas are more or less arrow shaped. These arrow-shaped areas are intermittently disposed over the surface of the release paper. The adhering force between the adhesive layer and the release paper is less in these spaced apart arrow-shaped areas than in the remainder of the area of contact between the release paper and the adhesive layer.

In use, a length of the double-faced tape is cut from the roll of tape. The exposed adhesive layer, the adhesive layer that does not have the release paper on it, is applied to a surface to which it is desired that something be attached. It is strongly pressed against that surface by pressing against the release paper to be sure there is strong aggressive adhesion between the surface and the tape. Once in place, it is then a simple matter to run your finger or fingernail along the surface of the release paper. By doing so, the areas of the release paper that have less adhesion to the adhesive layer will "flip up" or at least an edge will release itself from the adhesive, thus allowing the user to grasp that edge and readily remove the entire release paper exposing the second adhesive layer.

As can be appreciated, with prior art double faced tapes one is more or less in a "catch-22" situation. One desires the adhesive layer to be as aggressive in its adhesion characteristics as possible. By using such an aggressive adhesive, the release paper readily adheres to it and since it has been wound on a roll under tension, there is strong uniform adhesion between the release paper and the adhesive layer. To remove that release paper, one has to try to catch their fingernail between the release paper and the adhesive layer. This often is very difficult to do. As can be appreciated, the tape is used in a confined area, such as abutting a corner, it is almost impossible to remove the release paper. The present invention unexpectedly solves this problem in that by placing slits in the release paper to form spaced apart areas which have at least a portion of their periphery defined by a slit and modifying those areas so that they do not adhere to the adhesive layer to the degree that the remainder of the release paper adheres, one can readily rub their finger or scrap their fingernail over the release paper catching one of these less adhered areas which may then be easily grasped to remove the release paper from the adhesive layer.

Figure 3:
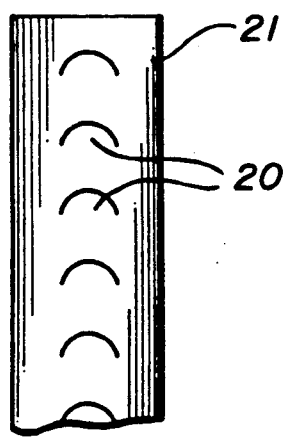
FIG. 3 is a plan view of another embodiment of the tape of the present invention.
Figure 4:
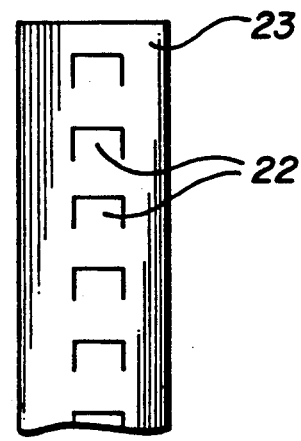
FIG. 4 is yet another embodiment of the tape of the present invention.

Referring to FIGS. 3 and 4, there are shown other configurations of areas having less adhesion to the adhesive layer. In FIG. 3, there are semi-circular slits 20 or half-circle areas that have less adhesion and which are intermittently disposed in spaced-apart areas over the release paper 21. In FIG. 4, there are 3-sided rectangles 22 intermittently disposed in spaced-apart areas over the surface of the release paper 23. These areas 22 have less adhesion to the adhesive layer than the remaining area of the release paper.

The shape of the slit areas will have a substantial effect on the propensity of that area to lift from the adhesive. For example, areas whose dimension in the longitudinal direction of the release paper is substantially greater than the dimension of the slit in the transverse direction of the paper will stay adhered to the adhesive until lifted by a fingernail or the like. However, if the longitudinal dimension is substantially less than the transverse dimension, the area may automatically lift from the adhesive after a period of time.

Figure 5:
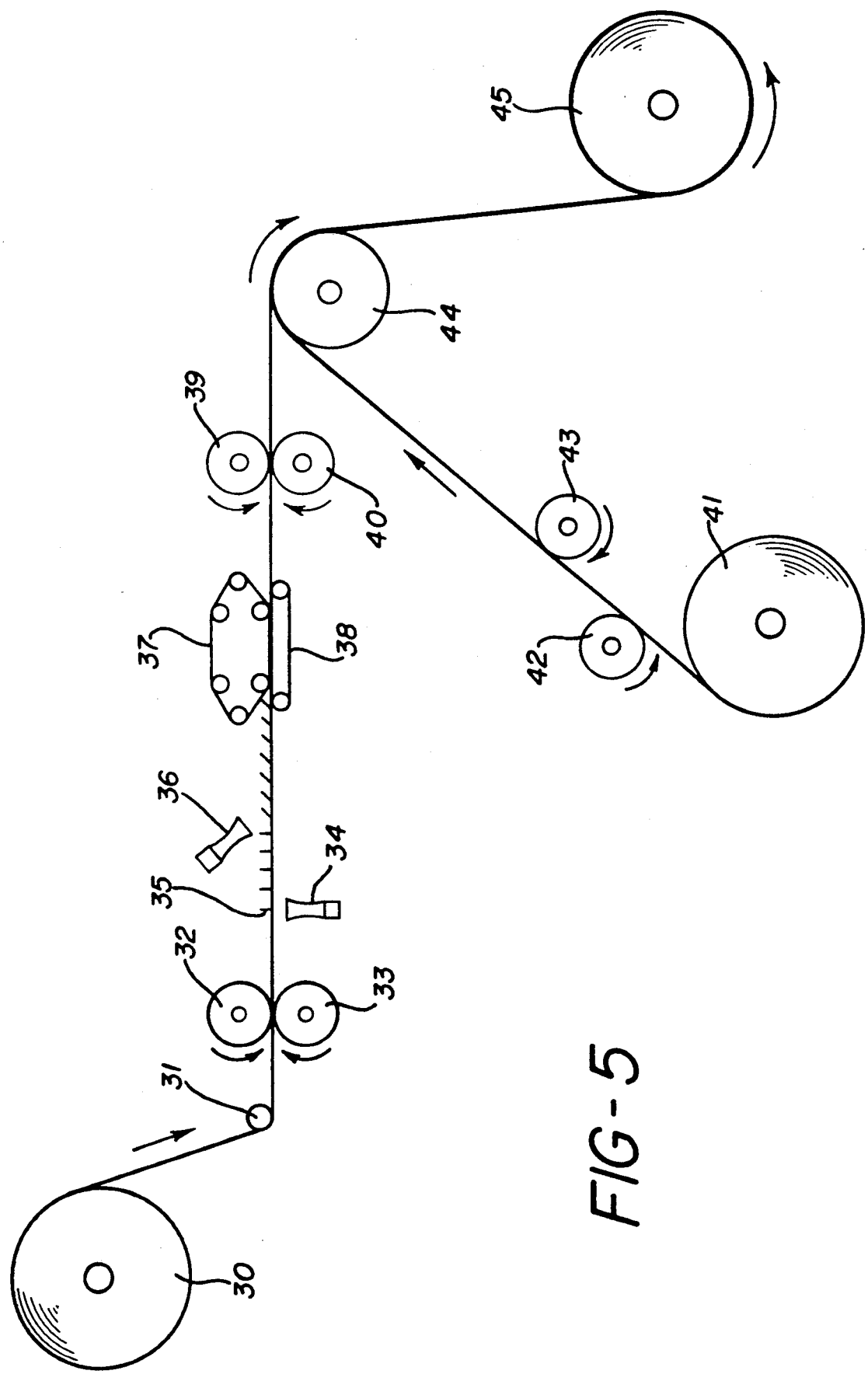
FIG. 5 is a schematic view of a process for manufacturing the tape of the present invention.

Referring to FIG. 5 of the drawings, there is schematically shown one method for producing the double-sided tape of the present invention. A roll of release paper 30 is fed over a guiding and idler roll 31 to a pair of rolls 32 and 33. The pair of rolls comprises a slitting or cutting roll 32 which places intermittent cut areas such as the arrows shown in FIG. 1, in the release paper. This roll is backed with a suitable back-up roll 33 as is well known. The release paper having the intermittent cuts in it is passed over an air-nozzle 34 and air is blown upwardly from below the release paper to cause the cut areas 35 to be angled away from the plane of the release paper as shown. This angled-away area has been enlarged in the schematic drawing to more clearly show what is meant by the action of the air nozzle. The release paper then passes under another air nozzle 36 which bends the intermittent cut areas back towards the plane of the release paper. This step also has been shown in an enlarged manner to more clearly depict this step in the process. The release paper, with these angled-back areas, is passed between a pair of conveyers 37 and 38 which press the cut areas substantially to the plane of the release paper and at an angle of approximately 180° to the original position of the area. The release paper is passed through the nip of a pair of rolls 39 and 40 with the upper roll 39 being a brush roll and counter rotating, that is, rotating in a clockwise direction to brush the cut areas back to their original position. As can be appreciated, at this time the release paper has been treated to produce a plurality of intermittent spaced apart cut or slit areas. The cut areas have a pre-set or a memory to deform out of the plane of the release paper.

A roll of suitable backing material 41 is first coated on one side with a pressure-sensitive adhesive utilizing any standard surface coating mechanism 42. The backing material is also coated on the opposite side with the same or similar pressure-sensitive adhesive also utilizing any standard surface coating mechanism 43 well known in the art. There are many variations of surface coating apparatus which include various combinations of coating rolls, knife coaters, mechanisms to control coating thickness, ovens or dryers and the like. Any of these well known apparatus may be used to apply adhesive to both surfaces of the backing layer. The backing material with adhesive on both surfaces is combined with the treated release paper by passing the two over the combining roller 44 and the final double-faced tape wound on a wind-up roll 45.

As can be appreciated, the method described above places intermittent spaced-apart cut areas in the release paper and deforms those areas and then places those areas back into the plane of the release paper. This technique provides the areas with a memory which causes the areas to want that area to again deform from the plane of the web. When the treated release paper is placed on an adhesive and a finger or fingernail scrapped over the surface of the release paper, these pre-formed or pre-set areas will release from the adhesive more readily and easier than the remainder of the release paper. This provides an area that can be readily gripped to remove the entire release paper from the adhesive.

While describing the method and apparatus of FIG. 5, the spaced apart areas have been deformed 180° degrees from the plane of the release paper to develop the differential adhesion, this may not be necessary in all instances. The amount of deformation required will depend on a number of factors such as the thickness and weight of the release paper, the aggressiveness of the adhesive used and so on.

Release papers that may be used to produce the double-faced tapes of the present invention may be any of the well known coated papers such as super calendered Kraft paper coated on both surfaces with a silicone release agent.

The backing materials that may be used to produce the tapes of the present invention are also well known and they comprise woven fabrics, non-woven fabrics, films or the like. A suitable backing material is a ? polyester film.

Any of the well known pressure-sensitive adhesives may be used. Examples of suitable pressure-sensitive adhesives are the thermoplastic rubber based adhesives, the natural rubber adhesives, the acrylic adhesives and the like. It is preferred that the same pressure-sensitive adhesive be used on both surfaces of the backing.

While preferred embodiments of the invention have been illustrated and described, it should be understood that variations will be apparent to those skilled in the art. Accordingly, the invention is not to be limited to the specific embodiments shown and described, but includes all embodiments encompassed within the scope of the following claims.

I claim:

1. A roll of double-sided, pressure-sensitive, adhesive tape comprising a backing layer, two adhesive layers, one of said adhesive layers disposed on one side of said backing layer and the second of said adhesive layers being disposed on the opposite side of said backing layer, said adhesive layers having similar adhesive properties and a release layer disposed on one of said adhesive layers, said release layer having a plurality of intermittently spaced apart slits disposed over its surface and inwardly of the longitudinal edges of said release layer, each of said slits defining a portion of the periphery of an intermittently spaced apart area to produce a plurality of intermittently spaced apart areas provided with a set and disposed over the surface of the release layer and inwardly of the longitudinal edges of said release layer, said areas having been deformed out of the plane of the release layer whereby said areas have a lesser degree of adhesion to the adhesive layer than the remainder of said layer and at least a portion of said areas remaining out of the plane of the release layer to provide easily grasped areas to facilitate removal of the release layer.

2. A roll of double-sided, pressure-sensitive adhesive tape according to claim 1 wherein the intermittently spaced apart areas are in the shape of an arrow.

3. A roll of double-sided pressure-sensitive adhesive tape according to claim 1 wherein the intermittently spaced apart areas are semi-circular in shape.

4. A roll of double-sided, pressure-sensitive adhesive tape according to claim 1 wherein the same adhesive is used in both adhesive layers.